(12) United States Patent
Silverstein

(10) Patent No.: US 7,450,778 B2
(45) Date of Patent: Nov. 11, 2008

(54) ARTIFACT REDUCTION IN A DIGITAL VIDEO

(75) Inventor: D. Amnon Silverstein, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 856 days.

(21) Appl. No.: 11/082,387

(22) Filed: Mar. 17, 2005

(65) Prior Publication Data

US 2006/0210191 A1    Sep. 21, 2006

(51) Int. Cl.
- G06K 9/40 (2006.01)
- G06K 9/64 (2006.01)
- G06K 9/00 (2006.01)
- H04N 5/00 (2006.01)
- H04N 1/40 (2006.01)
- H04N 1/38 (2006.01)

(52) U.S. Cl. ............... 382/275; 382/141; 382/260; 382/278; 348/607; 358/448; 358/463

(58) Field of Classification Search ............... 382/254, 382/260–261, 275; 358/448, 463
See application file for complete search history.

(56) References Cited

U.S. PATENT DOCUMENTS

| | | | |
|---|---|---|---|
| 5,063,603 A | 11/1991 | Burt | |
| 5,436,979 A | 7/1995 | Gray et al. | |
| 5,956,432 A * | 9/1999 | Ohta | 382/264 |
| 6,035,072 A | 3/2000 | Read | |
| 6,125,213 A | 9/2000 | Morimoto | |
| 6,137,917 A * | 10/2000 | Park | 382/262 |
| 6,233,364 B1 | 5/2001 | Krainiouk et al. | |
| 6,266,054 B1 | 7/2001 | Lawton et al. | |
| 6,578,017 B1 | 6/2003 | Ebersole et al. | |
| 6,792,161 B1 | 9/2004 | Imaizumi et al. | |
| 6,794,608 B2 | 9/2004 | Flood et al. | |
| 2002/0034337 A1* | 3/2002 | Shekter | 382/275 |
| 2002/0071613 A1 | 6/2002 | Ford et al. | |
| 2002/0106133 A1* | 8/2002 | Edgar et al. | 382/261 |
| 2002/0126911 A1* | 9/2002 | Gindele et al. | 382/254 |
| 2004/0052410 A1* | 3/2004 | Yasukawa et al. | 382/141 |
| 2005/0063583 A1* | 3/2005 | Lim et al. | 382/162 |

* cited by examiner

*Primary Examiner*—Brian Q Le
*Assistant Examiner*—Nathan Bloom

(57) ABSTRACT

A method performed by a processing system is provided. The method comprises performing a first set of correlations between a first plurality of pixel values in a first frame and a target pixel value in a target frame of a digital video across all of a plurality of color channels of the target pixel value, performing a second set of correlations between the first plurality of pixel values in the first frame and the target pixel value in the target frame across less than all of the plurality of color channels of the target pixel value, and determining whether the target pixel value is an artifact using the first set of correlations and the second set of correlations.

26 Claims, 7 Drawing Sheets

| PIXEL IDENTIFIER / 602 | CORRELATION VALUE / 604 | CORRELATION VALUE / 606 |
|---|---|---|
| PIXEL IDENTIFIER | CORRELATION VALUE | CORRELATION VALUE |
| . . . | . . . | . . . |
| PIXEL IDENTIFIER | CORRELATION VALUE | CORRELATION VALUE |

124

ARTIFACT REDUCTION IN A DIGITAL VIDEO

BACKGROUND

Movies, videos, and other images may be captured from one or more scenes using a video medium such as film and a video capture device such as a camera. After processing, the video medium may be used to reproduce the images by displaying the images using a display device such as a projector. Occasionally, artifacts caused by dust and scratches, for example, may appear on the video medium. The artifacts may affect the display of the images of the video medium in undesired ways.

For example, a video medium such as Technicolor film captured with a Technicolor camera may have artifacts in the form of dust or scratches on the surface of one or more of the color channels of the film. With the Technicolor camera, the images are captured using a separate filmstrip for the red, green, and blue colors to generate red, green, and blue channels for each image. As a result, dust or scratches on any one of the red, green or blue filmstrips may be displayed when an image is projected onto a screen or other display device.

Artifacts on a video medium may also appear in a digitized version of the video medium. In converting a video medium to a digital form, artifacts may also be converted and become part of a digital video. Consequently, the artifacts may appear when the digital video is viewed or displayed. It would be desirable to be able to improve the display of a digital video with artifacts.

SUMMARY

One form of the present invention provides a method performed by a processing system. The method comprises performing a first set of correlations between a first plurality of pixel values in a first frame and a target pixel value in a target frame of a digital video across all of a plurality of color channels of the target pixel value, performing a second set of correlations between the first plurality of pixel values in the first frame and the target pixel value in the target frame across less than all of the plurality of color channels of the target pixel value, and determining whether the target pixel value is an artifact using the first set of correlations and the second set of correlations.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

As described herein, a system, method, and program product for generating an enhanced digital video is provided. For each frame in the digital video, the system, method, and program product contemplate detecting and removing artifacts caused by dust and scratches, for example, to generate an enhanced digital video. An artifact in a frame is detected by comparing pixel values in the frame with pixel values from a previous and/or next frame and with other information. Once detected, the artifact is replaced with either pixel values derived from the previous and next frame. As a result, visual appearance of a digital video may be enhanced.

Figure 1:
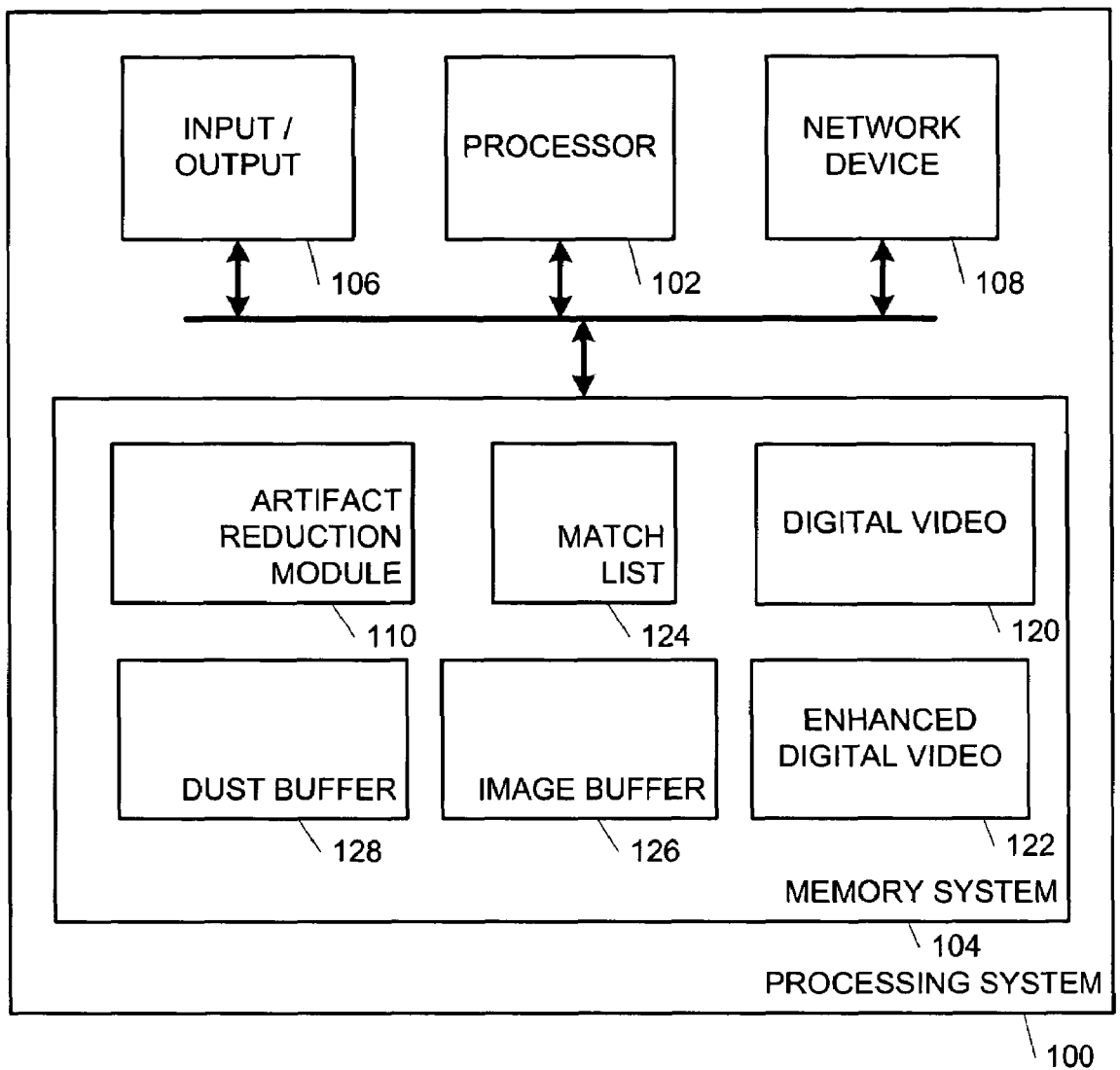
FIG. 1 is a block diagram illustrating a processing system configured to remove artifacts from a digital video according to one embodiment of the present invention.

FIG. 1 is a block diagram illustrating a processing system 100 configured to remove artifacts from a digital video 120. Processing system 100 comprises a processor 102, a memory system 104, an input/output unit 106, and a network device 108. Memory system 104 is for storing an artifact reduction module 110, digital video 120, an enhanced digital video 122, a match list 124, an image buffer 126, and a dust buffer 128.

Processing system 100 is configured to generate enhanced digital video 122 from digital video 120 using artifact reduction module 110. Processing system 100 comprises any type of computer system or portable or non-portable electronic device. Example computer systems include desktop, laptop, notebook, workstation, or server computer systems, and examples of electronic devices include digital cameras, digital video cameras, printers, scanners, mobile telephones, and personal digital assistants.

In one embodiment, artifact reduction module 110 comprises instructions stored in memory system 104 that are accessible and executable by processor 102. Memory system 104 comprises any number and types of volatile and non-volatile storage devices such as RAM, hard disk drives, CD-ROM drives, and DVD drives. In other embodiments, artifact reduction module 110 comprises any combination of hardware and software components configured to perform the functions described herein.

A user of processing system 100 can manage and control the operation of artifact reduction module 110 by providing inputs and receiving outputs using input/output unit 106.

Input/output unit 106 may comprise any combination of a keyboard, a mouse, a display device, or other input/output device that is coupled, directly or indirectly, to processing system 100.

Artifact reduction module 110 and digital video 120 may each be stored on a medium separate from processing system 100 (not shown) prior to being stored in processing system 100. Examples of such a medium include a hard disk drive, a compact disc (e.g., a CD-ROM, CD-R, or CD-RW), and a digital video disc (e.g., a DVD, DVD-R, or DVD-RW). Processing system 100 may access artifact reduction module 110 and digital video 120 from a remote processing or storage system (not shown) that comprises the medium using network device 108. Network device 108 may be coupled, directly or indirectly, to any type of wired or wireless local area, wide area, or global communications network.

Digital video 120 comprises a plurality of digital frames. Each frame may be displayed separately to form an image or in succession, e.g., 24 or 30 frames per second, to form a video (i.e., a set of images that may appear to be moving). Digital video 120 may comprise one or more scenes where a scene comprises a set of related frames. In one embodiment, digital video 120 comprises an RGB color space where each frame has a red channel with red pixel values, a blue channel with blue pixel values, and a green channel with green pixel values. The red, green, and blue pixel values are combined during the display of digital video 120 to reproduce the images of digital video 120. In other embodiments, each frame may comprise other sets of color channels or may combine the pixel values for each color.

Digital video 120 may be generated either from a video or other set of images from another medium, e.g., film, or from a camera or other image capture device directly. For example, a Technicolor film captured using a Technicolor camera may be converted into digital video 120 using a scanning process. In other embodiments, digital video 120 may comprise a single image frame or an unrelated set of image frames.

Figure 2:
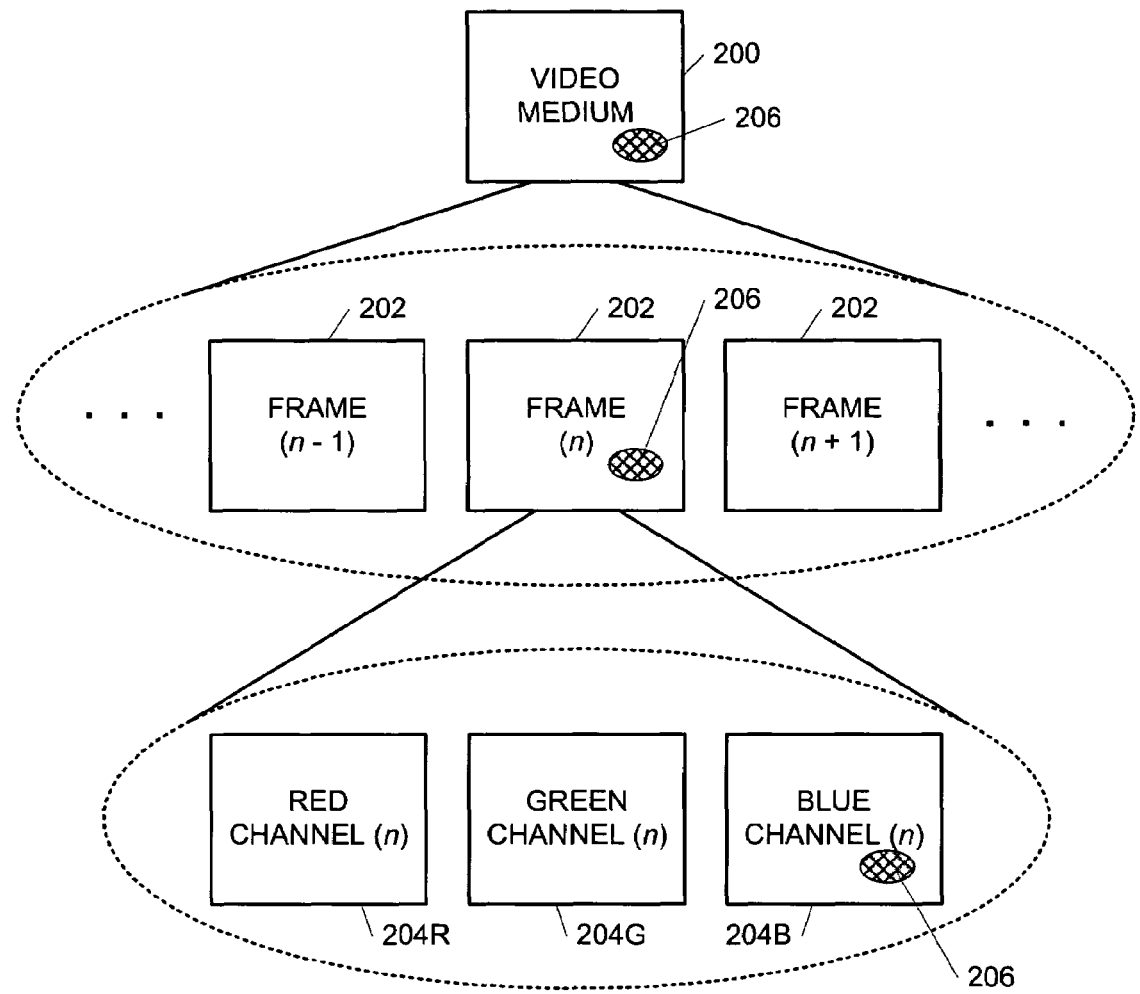
FIG. 2 is a block diagram illustrating a video medium with an artifact according to one embodiment of the present invention.

FIG. 2 is a block diagram illustrating a video medium 200 with an artifact 206 from which digital video 120 is generated. Video medium 200 comprises a sequential series of frames 202 where each frame has a red channel 204R, a green channel 204G, and a blue channel 204B, i.e., color channels 204. In one embodiment, video medium 200 comprises Technicolor film. In other embodiments, video medium 200 comprises other types of film or media.

In the example shown in FIG. 2, frame (n) 202 and blue channel (n) 204B comprises artifact 206 where n is an integer that designates a frame in the sequence. Artifact 206 may be any type of aberration in video medium 200, such as an aberration caused by dust or a scratch, which causes an undesired form, shape, or color to appear in the display of one or more images of video medium 200. Video medium 200 may comprise any number of artifacts 206 such that each frame 202 and each color channel 204 may have zero or more artifacts 206.

Figure 3:
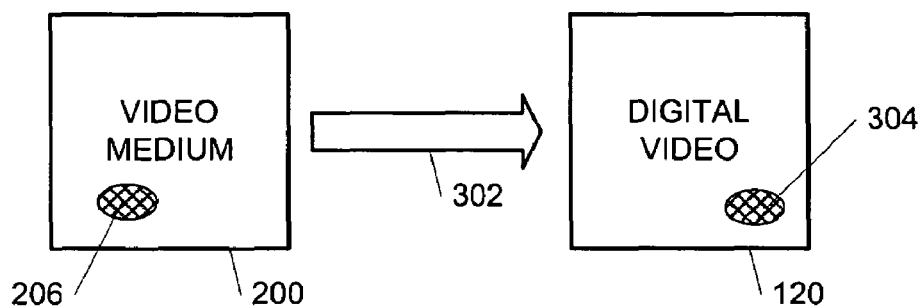
FIG. 3 is a block diagram illustrating a process of generating a digital video from a video medium with an artifact according to one embodiment of the present invention.

FIG. 3 is a block diagram illustrating a process of generating digital video 120 from video medium 200 as indicated by an arrow 302. In the process of converting video medium 200 to digital video 120, artifact 206 as well as any other artifacts (not shown) is reproduced in one or more of the frames or color channels of digital video 120 as artifact 304.

Figure 4:
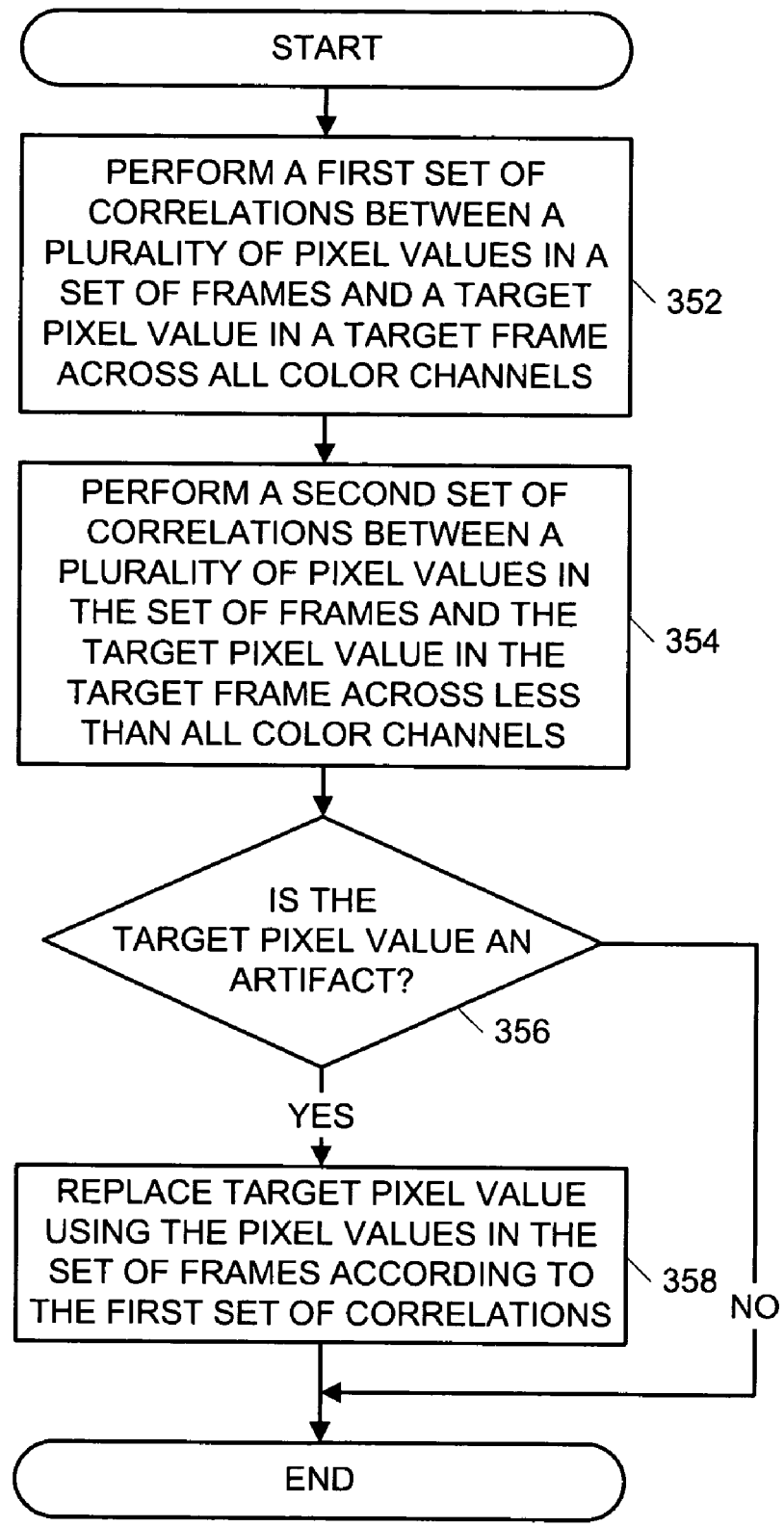
FIG. 4 is a flow chart illustrating a method for reducing artifacts from a digital video according to one embodiment of the present invention.
Figure 5A:
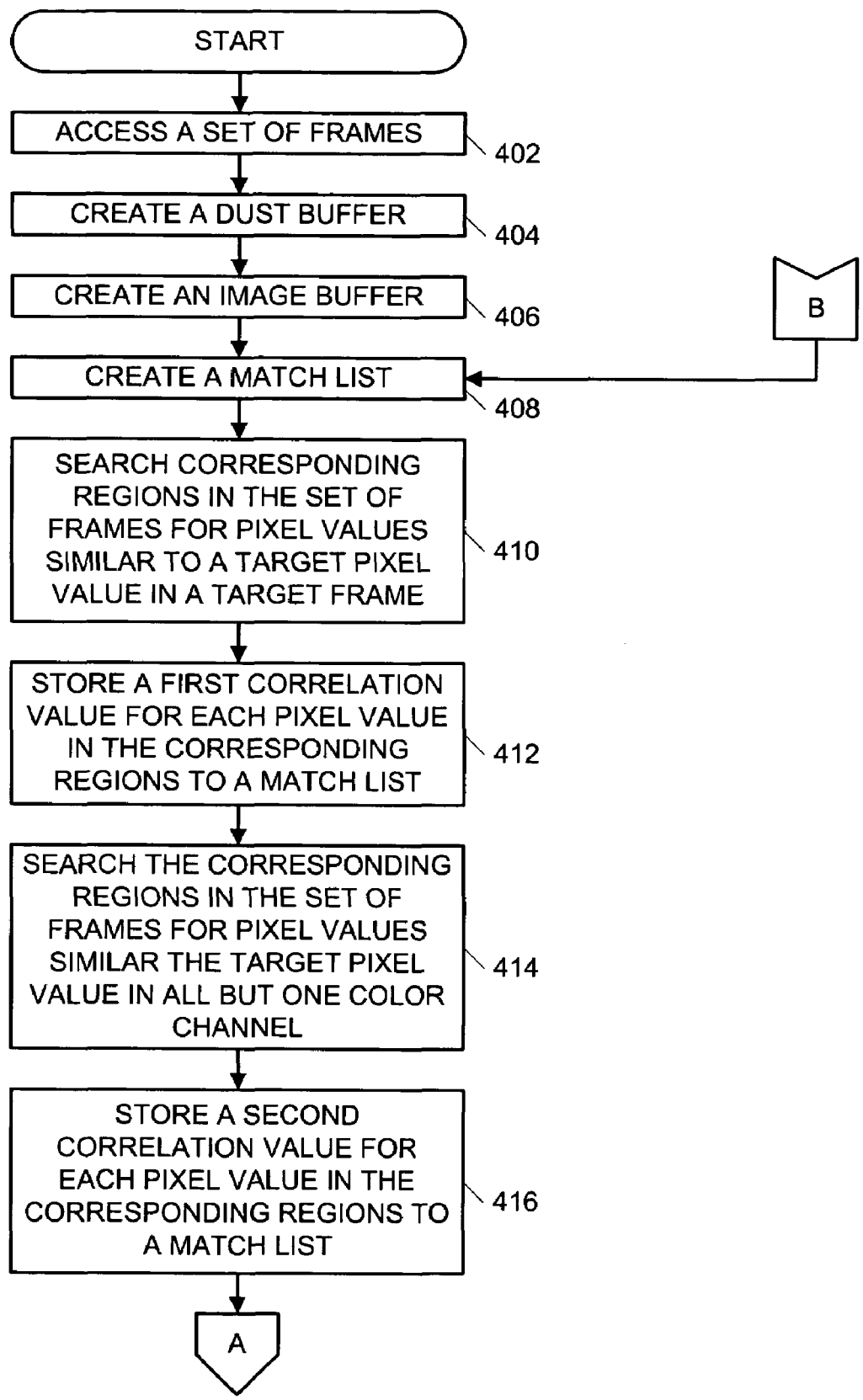
FIGS. 5A-5C are a flow chart illustrating a method for reducing artifacts from a digital video according to one embodiment of the present invention.
Figure 5B:
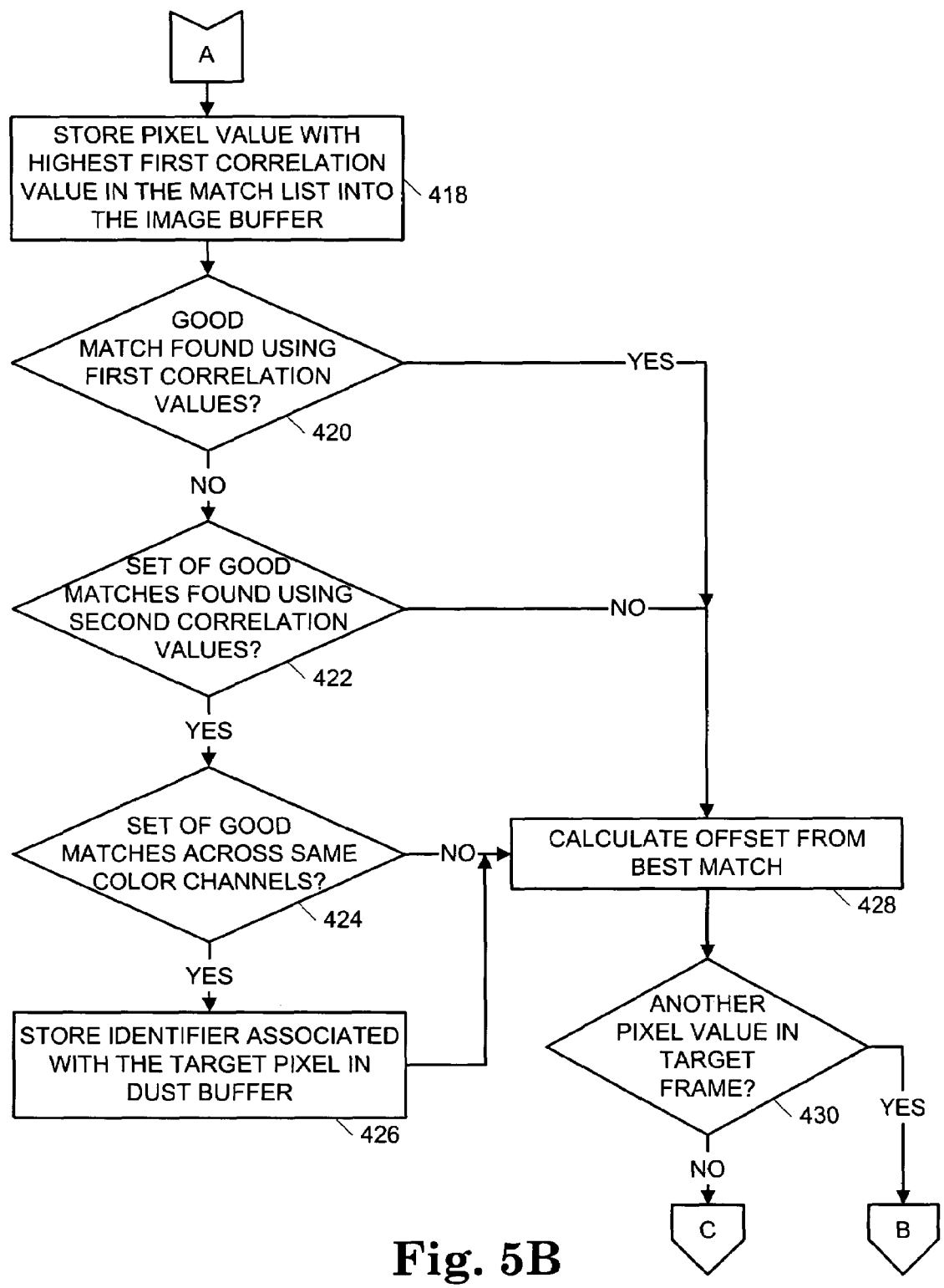
Figures 5C, 7:
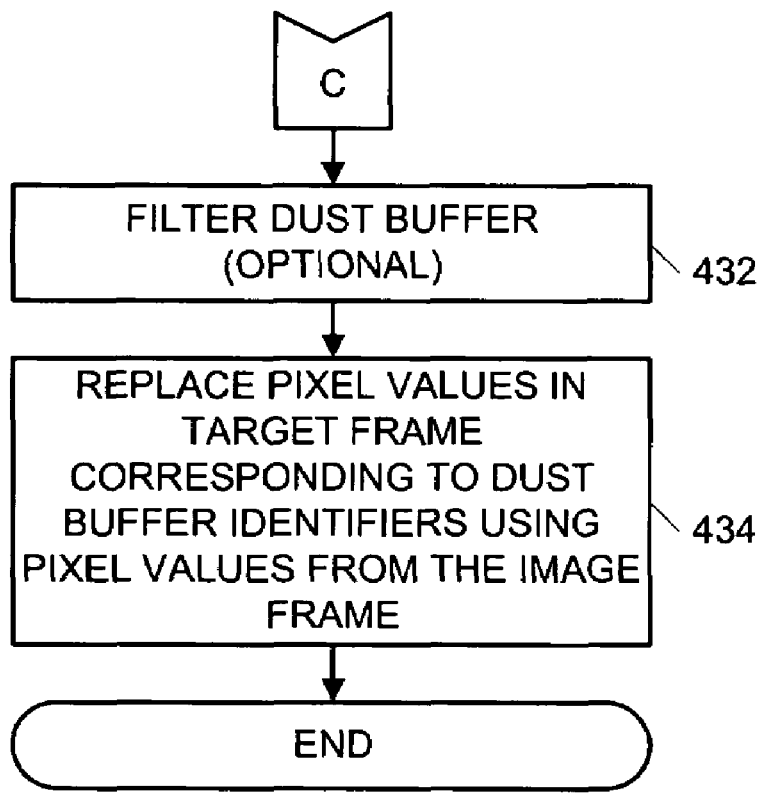
FIG. 7 is a block diagram illustrating a match list according to one embodiment of the present invention.

Referring back to FIG. 1, processing system 100 executes artifact reduction module 110 to generate enhanced digital video 122 from digital video 120. In doing so, artifact reduction module 110 attempts to remove artifact 304 and any other artifacts (not shown) from digital video 120 to generate enhanced digital video 122. FIG. 4 illustrates a method for reducing artifacts from digital video 120 to generate enhanced digital video 122 according to one embodiment, and FIGS. 5A-5C illustrates a method for reducing artifacts from digital video 120 to generate enhanced digital video 122 according to another embodiment.

Figure 6:
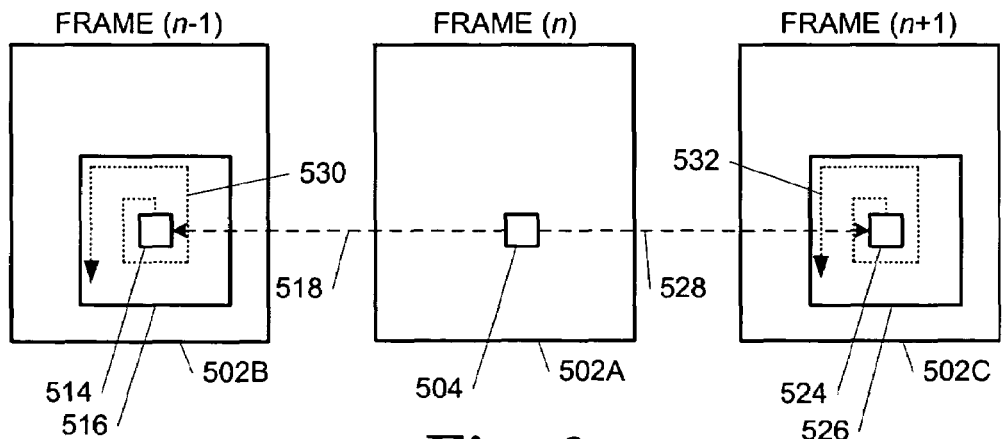
FIG. 6 is a block diagram illustrating a set of frames of a digital video according to embodiments of the present invention.

The operation of artifact reduction module 110 according to one embodiment will now be described with reference to FIGS. 4 and 6. FIG. 4 is a flow chart illustrating one embodiment of a method for reducing artifacts from digital video 120 to generate enhanced digital video 122. In one embodiment, the method is performed by processing system 100 using artifact reduction module 110 for each frame of digital video 120. FIG. 6 is a block diagram illustrating one embodiment of a set of frames.

In FIG. 6, a set of frames includes a target frame (n) 502A, a previous frame (n−1) 502B, and a next frame (n+1) 502C where n is an integer that designates a frame 502 in a sequential series of frames 502 of digital video 120. In one embodiment, each frame 502 comprises separate red, green, and blue color channels. In other embodiments, each frame 502 may comprise other separate or intermixed color channels.

In FIG. 4, artifact reduction module 110 performs a first set of correlations between a plurality of pixel values in a region 516 in frame 502B and/or a region 526 in frame 502C and a target pixel value 504 in target frame 502A of digital video 120 across all of the color channels of target pixel value 504 as indicated in a block 352. Artifact reduction module 110 performs the first set of correlations to identify similarities between the plurality of pixel values in region 516 in frame 502B and/or region 526 in frame 502C and target pixel value 504 across all of the color channels of target pixel value 504.

Artifact reduction module 110 performs a second set of correlations between the plurality of pixel values in region 516 and/or region 526 and target pixel value 504 across less than all of the plurality of color channels of target pixel value 504 as indicated in a block 354. Artifact reduction module 110 performs the second set of correlations to identify similarities between the plurality of pixel values in region 516 in frame 502B and/or region 526 in frame 502C and target pixel value 504 across less than all of the color channels of target pixel value 504, e.g., across two out of three color channels.

A determination is made by artifact reduction module 110 as to whether target pixel value 504 is an artifact using the first set of correlations and the second set of correlations as indicated in a block 356. In one embodiment, artifact reduction module 110 determines that target pixel value 504 is an artifact in response to not identifying a pixel value that is substantially similar to target pixel value 504 across all color channels using the first set of correlations and identifying a set of pixel values, e.g., ten pixel values, that are substantially similar to target pixel value 504 across less than all color channels, e.g., two out of three color channels, and not substantially similar to target pixel value 504 in the same color channel using the second set of correlations.

If target pixel value 504 is an artifact, then artifact reduction module 110 replaces target pixel value 504 in frame 502A using pixel values from region 516 in frame 502B and/or region 526 in frame 502C according to the first set of correlations as indicated in a block 358. More particularly, artifact reduction module 110 replaces target pixel value 504 using one or more pixel values from region 516 in frame 502B and/or region 526 in frame 502C that are substantially similar to target pixel value 504 according to the first set of correlations.

The operation of artifact reduction module 110 according to one embodiment will now be described with reference to FIGS. 5A, 5B, 5C, and 6. FIGS. 5A, 5B, and 5C are a flow chart illustrating a method for reducing artifacts in digital video 120 to generate enhanced digital video 122. In one embodiment, the method is performed by processing system 100 using artifact reduction module 110 for each frame of digital video 120. FIG. 6 is a block diagram illustrating one embodiment of a set of frames.

In FIG. 5A, artifact reduction module 110 accesses a set of frames of digital video 120 as indicated in a block 402. As shown in FIG. 6, the set of frames, in one embodiment, comprises at least target frame 502A, previous frame 502B, and next frame 502C. In one embodiment, each frame 502 comprises separate red, green, and blue color channels. In other embodiments, each frame 502 may comprise other separate or intermixed color channels. In other embodiments, other numbers of frames 502 may be accessed by artifact reduction module 110.

Artifact reduction module 110 creates dust buffer 128 in memory system 104 as indicated in a block 404. In one embodiment, dust buffer 128 includes an identifier for each pixel value in frame 502A. Artifact reduction module 110 initializes the identifiers to a default value, e.g., a value of zero, to initially identify each pixel value as not being associated with an artifact in one embodiment. As will be described in additional detail below, artifact reduction module 110 sets the identifier to other values for each target pixel value that is determined to be an artifact. In one embodiment, the value of the identifier identifies the color channel of the target pixel value that includes the artifact. For example, a value of one may indicate an artifact in the red color channel of the target pixel value, a value of two may indicate an artifact in the green color channel of the target pixel value, and a value of three may indicate an artifact in the blue color channel of the target pixel value.

Artifact reduction module 110 creates image buffer 126 in memory system 104 as indicated in a block 406. In one embodiment, image buffer 126 includes a pixel value for each pixel value in each color channel in frame 502A. As will be described in additional detail below, artifact reduction module 110 uses the pixel values in image buffer 126 to replace pixel values in frame 502A that are determined to comprise an artifact. In one embodiment, artifact reduction module 110 replaces all color channels of a pixel value that includes an artifact using the pixel values in image buffer 126.

Artifact reduction module 110 creates match list 124 in memory system 104 as indicated in a block 408. Match list 124 is configured to store information that correlates a target pixel value 504 in frame 502A with pixel values in corresponding regions of frames 502B and 502C. As will be described in additional detail below, artifact reduction module 110 uses the information in match list 124 to determine whether target pixel value 504 in frame 502A comprises an artifact.

Artifact reduction module 110 searches corresponding regions in the set of frames for pixel values similar to target pixel value 504 in target frame 502A as indicated in a block 410.

To identify a corresponding region in the set of frames, artifact reduction module 110 identifies a corresponding pixel value in each frame in the set and then identifies a corresponding region in each frame that includes the corresponding pixel value. In the embodiment shown in FIG. 6, artifact reduction module 110 identifies a corresponding pixel value 514 in frame 502B as indicated by an arrow 518. Artifact reduction module 110 identifies a corresponding region 516 in frame 502B that includes corresponding pixel value 514. Similarly, artifact reduction module 110 identifies a corresponding pixel value 524 in frame 502C as indicated by an arrow 528. Artifact reduction module 110 identifies a corresponding region 526 in frame 502C that includes corresponding pixel value 524. In one embodiment, regions 516 and 526 each comprise a predetermined size, e.g., 50 pixels wide by 50 pixels long, with pixel values 514 and 524 being centered or substantially centered within regions 516 and 526, respectively. In other embodiments, the size of regions 516 and 526 may be determined in other suitable ways.

Artifact reduction module 110 compares target pixel value 504 with each pixel value in each region 516 and 526 to search for pixel values in frames 502B and 502C that are similar to target pixel value 504. In one embodiment, artifact reduction module 110 compares the pixel values in each region according to a spiral pattern where artifact reduction module 110 compares the pixel values in each region in an order based on how close a pixel value is to the pixel value that corresponds to the target pixel value in each region, i.e. a starting pixel value.

In the example of FIG. 6, artifact reduction module 110 first compares target pixel value 504 with corresponding pixel value 514 in corresponding region 516 and then continues to compare pixel values following a spiral pattern 530 where pixel values nearer to pixel value 514 are compared prior to comparing pixel values that are farther from pixel value 514. Similarly, artifact reduction module 110 first compares target pixel value 504 with corresponding pixel value 524 in corresponding region 526 and then continues to compare pixel values following a spiral pattern 532 where pixel values nearer to pixel value 524 are compared prior to comparing pixel values that are farther from pixel value 524.

In one embodiment, target pixel value 504 includes separate pixel values for each color channel. In this embodiment, artifact reduction module 110 compares the pixel values for each color channel of target pixel value 504 with respective pixel values of each color channel for each pixel value in regions 516 and 526.

In response to comparing target pixel value 504 with each pixel value in each region 516 and 526, artifact reduction module 110 generates a first set of correlation values. Each of the first correlation values comprises a measurement of how similar target pixel value 504 is to a corresponding pixel value in region 516 or 526 over all of the color channels of target pixel value 504. Artifact reduction module 110 stores the first correlation value for each pixel value in the corresponding regions to match list 124 as indicated in a block 412.

In one embodiment, artifact reduction module 110 stops comparing target pixel value 504 to pixel values in regions 516 and 526 in response to detecting a good match between target pixel value 504 and a pixel value in region 516 or 526. A good match comprises a substantial similarity between all of the color channels of target pixel value 504 and the pixel value in region 516 or 526. In one embodiment, artifact reduction module 110 determines that a good match is found in response to comparing a first correlation value associated with a pixel value in region 516 or 526 with one or more threshold values. Depending on the type of measurement used to generate the first correlation value, artifact reduction module 110 may determine that a good match is found in response to the first correlation value being above, below, within, outside, or equal to the one or more threshold values.

Artifact reduction module 110 searches corresponding regions in the set of frames for pixel values similar to target pixel value 504 in all but one color channel as indicated in a block 414. To do so, artifact reduction module 110 compares target pixel value 504 with each pixel value in each region 516 and 526 to search for pixel values in frames 502B and 502C that are similar to target pixel value 504 in all but one color channel. For example, pixel value 514 may be similar to target pixel value 504 in the red and green channels but dissimilar to target pixel value 504 in the blue channel. In one embodiment, artifact reduction module 110 compares the pixel values in each region according to spiral patterns 530 and 532 as described above.

In one embodiment, target pixel value 504 includes separate pixel values for each color channel. In this embodiment, artifact reduction module 110 compares the pixel values for each color channel of target pixel value 504 with respective pixel values of each color channel for each pixel value in regions 516 and 526.

In response to comparing target pixel value 504 with each pixel value in each region 516 and 526, artifact reduction module 110 generates a second correlation value. Each of the second correlation values comprises a measurement of how similar target pixel value 504 is to a corresponding pixel value in region 516 or 526 over all but one of the color channels of target pixel value 504 where the color channel that is least similar to target pixel value 504 is excluded. Artifact reduction module 110 stores the second correlation value for each pixel value in the corresponding regions to match list 124 as indicated in a block 416.

In one embodiment, artifact reduction module 110 performs the functions of blocks 410 and 414 substantially simultaneously on each pixel value in regions 516 and 526. In other embodiments, artifact reduction module 110 performs the functions of blocks 410 and 414 separately.

FIG. 7 is a block diagram illustrating one embodiment of match list 124. In the embodiment shown in FIG. 7, match list 124 includes a pixel identifier field 602, a first correlation value field 604, and a second correlation value field 606 for each pixel value in regions 516 and 526 that is compared to target pixel value 504 by artifact reduction module 110. Pixel identifier field 602 stores a value that identifies a pixel in region 516 or 526. First correlation value field 604 and second correlation value field 606 store a first correlation value and a second correlation value, respectively, as described above.

The method continues at point A in FIG. 5B. In FIG. 5B, artifact reduction module 110 stores the pixel value with the highest first correlation value in match list 124 in image buffer 126 as indicated in a block 418. The pixel value with the highest first correlation value is considered to be the best match of the pixel values in regions 516 and 526 with target pixel value 504. Accordingly, artifact reduction module 110 stores the best match pixel value in image buffer 126.

Figure 8:
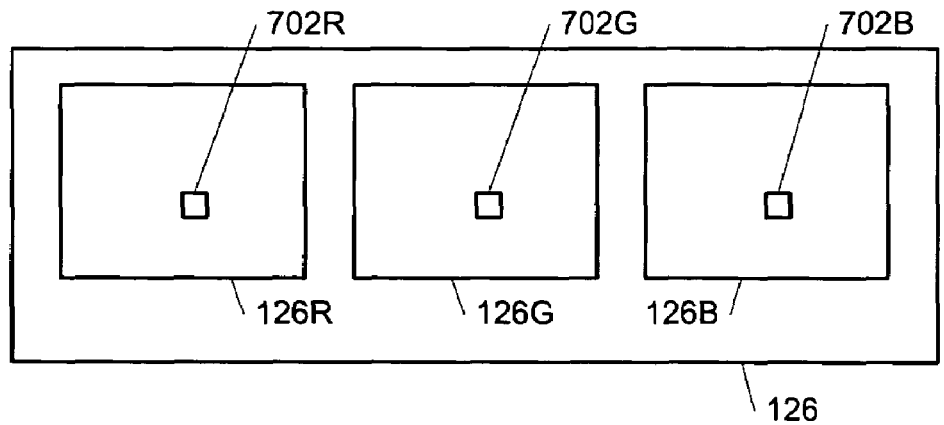
FIG. 8 is a block diagram illustrating an image buffer according to one embodiment of the present invention.

In an embodiment where target pixel value 504 includes separate pixel values for each color channel, artifact reduction module 110 stores each color channel of the best match pixel value in image buffer 126 as shown in the example of FIG. 8. FIG. 8 is a block diagram illustrating one embodiment of image buffer 126. Image buffer 126 includes color channel buffers 126R, 126G, and 126B that correspond to the red, green, and blue color channels, respectively, of target frame 502A. In the example of FIG. 8, artifact reduction module 110 stores red, green, and blue color channels of the best match pixel from region 516 or 526 as pixel values 702R, 702G, and 702B, respectively, in color channel buffers 126R, 126G, and 126B.

A determination is made by artifact reduction module 110 as to whether a good match is found using the first correlation values as indicated in a block 420. For the first correlation values, a good match comprises a substantial similarity between all of the color channels of target pixel value 504 and a pixel value in region 516 or 526. In one embodiment, artifact reduction module 110 determines that a good match is found in response to comparing a first correlation value associated with a pixel value in region 516 or 526 with one or more threshold values. Depending on the type of measurement used to generate the first correlation value, artifact reduction module 110 may determine that a good match is found in response to the first correlation value being above, below, within, outside, or equal to the one or more threshold values.

If a good match is not found using the first correlation values, then a determination is made by artifact reduction module 110 as to whether a set of good matches is found using the second correlation values as indicated in a block 422. For the second correlation values, a good match comprises a substantial similarity between all but one of the color channels of target pixel value 504 and a pixel value in region 516 or 526. In one embodiment, artifact reduction module 110 determines that a good match is found in response to comparing a second correlation value associated with a pixel value in region 516 or 526 with one or more threshold values. Depending on the type of measurement used to generate the second correlation value, artifact reduction module 110 may determine that a good match is found in response to the second correlation value being above, below, within, outside, or equal to the one or more threshold values. In one embodiment, the set of good matches includes a minimum number of good matches, e.g., ten. In other embodiments, the set of good matches may include a variable number of good matches.

If a set of good matches is found using the second correlation values, then a determination is made by artifact reduction module 110 as to whether the set of good matches are similar across the same color channels as indicated in a block 424. In one embodiment, if artifact reduction module 110 identifies a set of good matches using the second correlation values, then artifact reduction module 110 determines whether the set of good matches are similar across the same color channels and differ in a color channel excluded from the second correlation values, e.g., each of the good matches is similar in the red and green color channels but differ in the blue color channel.

If the set of good matches are similar across the same color channels, then the excluded color channel of target pixel value 504 most likely includes an artifact, and artifact reduction module 110 stores an identifier associated with target pixel value 504 in dust buffer 128 as indicated in a block 426. Artifact reduction module 110 stores the identifier to indicate that target pixel value 504 is likely an artifact. The value of the identifier identifies the color channel of the target pixel value that includes the artifact.

Figure 9:
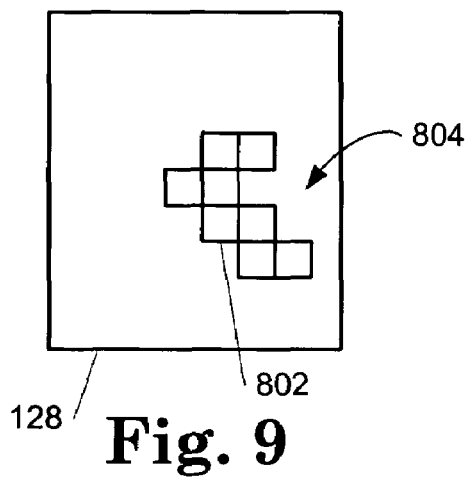
FIG. 9 is a block diagram illustrating a dust buffer according to one embodiment of the present invention.

FIG. 9 is a block diagram illustrating one embodiment of dust buffer 128. In the example of FIG. 9, artifact reduction module 110 stores identifier 802 in dust buffer 128. For example, identifier 802 may identify the blue color channel of target pixel value 504 to indicate that the blue color channel of target pixel value 504 includes an artifact.

If a good match is found using the first correlation values, or if a set of good matches is not found using the second correlation values, or if a set of good matches is not found across the same color channels using the second correlation values, then target pixel value 504 is likely not an artifact. Accordingly, artifact reduction module 110 does not identify target pixel value 504 as an artifact pixel in dust buffer 128.

Subsequent to block 426, or if a good match is found using the first correlation values, or if a set of good matches is not found using the second correlation values, or if a set of good matches is not found across the same color channels using the second correlation values, then artifact reduction module 110 calculates an offset from a best match between target pixel value 504 and a pixel value in region 516 or 526 as indicated in a block 528. For example, a best match for target pixel value 504 may be found at an offset calculated by artifact reduction module 110 to be two pixels up and two pixels to the left of target pixel value 504. Artifact reduction module 110 calculates the offset to enhance the search for good matches of a next target pixel value in target frame 502A as described below with reference to FIG. 10.

A determination is made by artifact reduction module 110 as to whether there is another pixel value in target frame 502A to process as indicated in a block 430. If there is another pixel value in target frame 502A to process, then the method continues at block B in FIG. 5A to repeat the function of block 408 using the offset calculated in block 428.

Figure 10:
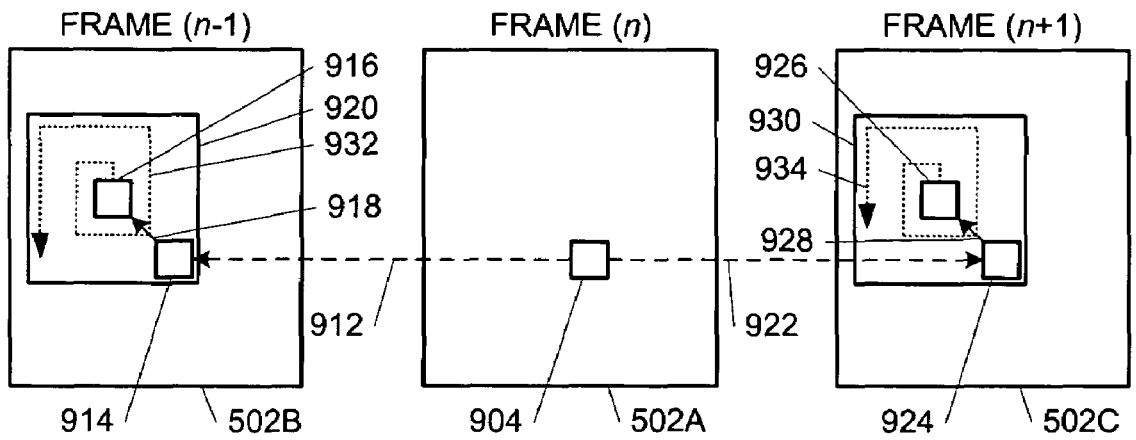
FIG. 10 is a block diagram illustrating a set of frames of a digital video according to one embodiment of the present invention.

In performing the functions of blocks 410 and 414 for a next target pixel value, artifact reduction module 110 uses the offset calculated in block 428 for the previous target pixel value 504. For example, the offset from previous target pixel value 504 to a best match may be two pixels up and two pixels to the left of previous target pixel value 504. FIG. 10 illustrates this example. For a next target pixel value 904 of frame 502A, artifact reduction module 110 begins searching for similar pixel values at pixel value 916. Pixel value 916 is offset from a pixel value 914 that corresponds to next target pixel value 904 in frames 502B (as indicated by an arrow 912) by two pixels up and two pixels to the left. A region 920 to be searched by artifact reduction module 110 also shifts by two pixels up and two pixels to the left. Artifact reduction module 110 searches region 920 using a spiral pattern 932 in one embodiment. Similarly, pixel value 926 is offset from a pixel value 924 that corresponds to next target pixel value 904 in frames 502C (as indicated by an arrow 922) by two pixels up and two pixels to the left. A region 930 to be searched by artifact reduction module 110 also shifts by two pixels up and two pixels to the left. Artifact reduction module 110 searches region 930 using a spiral pattern 934 in one embodiment.

After all or selected pixel values in target frame 502A are processed, dust buffer 128 includes a set of identifiers that indicate likely artifacts as shown in FIG. 9. In the example of FIG. 9, an artifact region 804 that includes a set of adjacent identifiers in dust buffer 128 identifies a likely artifact in the a color channel, e.g., the blue color channel, of frame 502A.

The method of FIGS. 5A-5C continues at block C in FIG. 5C. In FIG. 5C, artifact reduction module 110 optionally filters dust buffer 128 as indicated in a block 432. Artifact reduction module 110 may filter dust buffer 128 using to any suitable algorithm. In one embodiment, artifact reduction module 110 filters dust buffer 128 by morphologically dilating artifact regions, such as region 804 in FIG. 9, to make the regions larger. Artifact reduction module 110 morphologically dilates an artifact region by setting identifiers in dust buffer 128 that are adjacent to an artifact region to expand the size of the artifact region. By doing so, artifact regions may be more accurately mapped by dust buffer 128.

In another embodiment, artifact reduction module 110 filters dust buffer 128 by eliminating artifact regions that are too large, too small, or otherwise have a shape that does not resemble an artifact such as dust or a scratch. Artifact reduction module 110 eliminates an artifact region by changing the identifiers dust buffer 128 to not indicate an artifact. By doing so, artifact regions that may be false positives may be eliminated from dust buffer 128.

In a further embodiment, artifact reduction module 110 filters dust buffer 128 by extending artifact regions in the direction of elongation. Artifact reduction module 110 extends an artifact region by setting identifiers in dust buffer 128 that are adjacent to an artifact region to elongate the size of the artifact region in the direction of elongation. By doing so, artifact regions that are scratches may be more accurately mapped by dust buffer 128.

Referring back to FIG. 5C, artifact reduction module 110 replaces pixel values in target frame 502A corresponding to identifiers in dust buffer 128 using pixel values from image buffer 126 as indicated in a block 434. In one embodiment, artifact reduction module 110 copies a pixel value in image buffer 126 into frame 502A for each identifier in dust buffer 128 that indicates an artifact. In another embodiment, artifact reduction module 110 copies an average or median of pixel values adjacent to a pixel value in image buffer 126 into pixel values in frame 502A that correspond to identifiers in dust buffer 128. In other embodiments, artifact reduction module 110 performs other processing on pixel values in image buffer 126 to generate replacement pixel values for pixel values in frame 502A that correspond to identifiers in dust buffer 128. Frame 502A, with the replaced pixel values, becomes part of enhanced digital video 122.

The method of FIGS. 5A-5C is repeated for all or selected frames in digital video 120 to generate enhanced digital video 122.

Using the system and method described above, artifacts in a digital video, such as those that appear in a video medium from which the digital video is derived, may be removed. Accordingly, the display of the digital video may be enhanced.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a processing system, the method comprising:
   performing a first set of correlations between a first plurality of pixel values in a first frame and a target pixel value in a target frame of a digital video across all of a plurality of color channels of the target pixel value;
   performing a second set of correlations between the first plurality of pixel values in the first frame and the target pixel value in the target frame across less than all of the plurality of color channels of the target pixel value; and
   determining whether the target pixel value is an artifact using the first set of correlations and the second set of correlations.

2. The method of claim 1 further comprising:
   replacing the target pixel value in the target frame using the first plurality of pixel values in response to determining that the target pixel value is the artifact.

3. The method of claim 1 further comprising:
   generating a first set of correlation values in response to performing the first set of correlations; and
   generating a second set of correlation values in response to performing the second set of correlations.

4. The method of claim 3 further comprising:
   determining that the target pixel value is the artifact in response to the first set of correlations values indicating that the target pixel value is not similar to the first plurality of pixel values across all of the plurality of color channels and the second set of correlations values indicating that the target pixel value is similar to the first plurality of pixel values across less than all of the plurality of color channels.

5. The method of claim 4 further comprising:
determining that the target pixel value is the artifact in response to the second set of correlations values indicating that the target pixel value is similar to the first plurality of pixel values across an identical set of less than all of the plurality of color channels.

6. The method of claim 1 further comprising:
identifying a substantial similarity between a first one of the first plurality of pixel values and the target pixel value using the first set of correlations; and
calculating an offset between the first one of the first plurality of pixel values and a second one of the plurality of pixel values that corresponds to a relative location of the target pixel value in the target frame.

7. The method of claim 1 further comprising:
storing an identifier in a buffer in response to determining that the target pixel value is an artifact.

8. The method of claim 1 further comprising:
storing at least one of the first plurality of pixel values in an image buffer.

9. The method of claim 1 further comprising:
performing a third set of correlations between a second plurality of pixel values in a second frame and the target pixel value in the target frame across all of the plurality of color channels of the target pixel value;
performing a fourth set of correlations between the second plurality of pixel values in the second frame and the target pixel value in the target frame across less than all of the plurality of color channels of the target pixel value; and
determining whether the target pixel value is the artifact using the first set of correlations, the second set of correlations, the third set of correlations, and the fourth set of correlations.

10. A system comprising:
a processor; and
a memory system for storing a digital video and an artifact reduction module;
wherein the processor is configured to execute the artifact reduction module to:
perform a first set of correlations between a first plurality of pixel values in a first frame and a target pixel value in a target frame of the digital video across all of a plurality of color channels of the target pixel value;
perform a second set of correlations between the first plurality of pixel values in the first frame and the target pixel value in the target frame across less than all of the plurality of color channels of the target pixel value; and
determine whether the target pixel value is an artifact using the first set of correlations and the second set of correlations.

11. The system of claim 10 wherein the processor is configured to execute the artifact reduction module to:
replace the target pixel value in the target frame using the first plurality of pixel values in response to determining that the target pixel value is the artifact.

12. The system of claim 10 wherein the processor is configured to execute the artifact reduction module to:
generate a first set of correlation values in response to performing the first set of correlations; and
generate a second set of correlation values in response to performing the second set of correlations.

13. The system of claim 12 wherein the processor is configured to execute the artifact reduction module to:
determine that the target pixel value is the artifact in response to the first set of correlations values indicating that the target pixel value is not similar to the first plurality of pixel values across all of the plurality of color channels and the second set of correlations values indicating that the target pixel value is similar to the first plurality of pixel values across less than all of the plurality of color channels.

14. The system of claim 13 wherein the processor is configured to execute the artifact reduction module to:
determine that the target pixel value is the artifact in response to the second set of correlations values indicating that the target pixel value is similar to the first plurality of pixel values across an identical set of less than all of the plurality of color channels.

15. The system of claim 10 wherein the processor is configured to execute the artifact reduction module to:
store an identifier corresponding to the target pixel value in a first buffer in the memory system in response to determining that the target pixel value is an artifact; and
store at least one of the first plurality of pixel values in a second buffer in the memory system.

16. The system of claim 15 wherein the processor is configured to execute the artifact reduction module to:
replace the target pixel value in the target frame using the at least one of the first plurality of pixel values in the image buffer in response to detecting the identifier in the first buffer.

17. The system of claim 15 wherein the processor is configured to execute the artifact reduction module to:
filter the first buffer.

18. The system of claim 10 wherein the processor is configured to execute the artifact reduction module to:
perform a third set of correlations between a second plurality of pixel values in a second frame and the target pixel value in the target frame across all of the plurality of color channels of the target pixel value;
perform a fourth set of correlations between the second plurality of pixel values in the second frame and the target pixel value in the target frame across less than all of the plurality of color channels of the target pixel value; and
determine whether the target pixel value is the artifact using the first set of correlations, the second set of correlations, the third set of correlations, and the fourth set of correlations.

19. A system comprising:
means for performing a first set of correlations between a first plurality of pixel values in a first frame and a target pixel value in a target frame of a digital video across all of a plurality of color channels of the target pixel value;
means for performing a second set of correlations between the first plurality of pixel values in the first frame and the target pixel value in the target frame across less than all of the plurality of color channels of the target pixel value; and
means for determining whether the target pixel value is an artifact using the first set of correlations and the second set of correlations.

20. The system of claim 19 further comprising:
means for replacing the target pixel value in the target frame using the first plurality of pixel values in response to determining that the target pixel value is the artifact.

21. The system of claim 19 further comprising:
means for performing a third set of correlations between a second plurality of pixel values in a second frame and the target pixel value in the target frame across all of the plurality of color channels of the target pixel value;

means for performing a fourth set of correlations between the second plurality of pixel values in the second frame and the target pixel value in the target frame across less than all of the plurality of color channels of the target pixel value; and means for determining whether the target pixel value is the artifact using the first set of correlations, the second set of correlations, the third set of correlations, and the fourth set of correlations.

22. A program product comprising a computer-readable medium including instructions executable by a processing system for:

performing a first set of correlations between a first plurality of pixel values in a first frame and a target pixel value in a target frame of a digital video across all of a plurality of color channels of the target pixel value;

performing a second set of correlations between the first plurality of pixel values in the first frame and the target pixel value in the target frame across less than all of the plurality of color channels of the target pixel value; and determining whether the target pixel value is an artifact using the first set of correlations and the second set of correlations.

23. The program product of claim 22 wherein the computer-readable medium includes instructions executable by the processing system for:

replacing the target pixel value in the target frame using the first plurality of pixel values in response to determining that the target pixel value is the artifact.

24. The program product of claim 22 wherein the computer-readable medium includes instructions executable by the processing system for:

generating a first set of correlation values in response to performing the first set of correlations; and generating a second set of correlation values in response to performing the second set of correlations.

25. The program product of claim 24 wherein the computer-readable medium includes instructions executable by the processing system for:

determining that the target pixel value is the artifact in response to the first set of correlations values indicating that the target pixel value is not similar to the first plurality of pixel values across all of the plurality of color channels and the second set of correlations values indicating that the target pixel value is similar to the first plurality of pixel values across less than all of the plurality of color channels.

26. The program product of claim 25 wherein the computer-readable medium includes instructions executable by the processing system for:

determining that the target pixel value is the artifact in response to the second set of correlations values indicating that the target pixel value is similar to the first plurality of pixel values across an identical set of less than all of the plurality of color channels.

* * * * *